(12) United States Patent
Ishida et al.

(10) Patent No.: US 7,647,995 B2
(45) Date of Patent: Jan. 19, 2010

(54) RIDING TYPE VEHICLE

(75) Inventors: Yousuke Ishida, Shizuoka (JP);
Akifumi Oishi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 484 days.

(21) Appl. No.: 11/461,331

(22) Filed: Jul. 31, 2006

(65) Prior Publication Data
US 2007/0023220 A1 Feb. 1, 2007

(30) Foreign Application Priority Data
Aug. 1, 2005 (JP) ............................. 2005-222919
Jun. 30, 2006 (JP) ............................. 2006-182021

(51) Int. Cl.
*B60K 11/00* (2006.01)
*B60K 11/06* (2006.01)

(52) U.S. Cl. .................................... 180/68.1; 180/68.2

(58) Field of Classification Search ................ 280/68.1, 280/68.2
See application file for complete search history.

(56) References Cited

U.S. PATENT DOCUMENTS

| | | | | |
|---|---|---|---|---|
| 4,697,665 A | * | 10/1987 | Eastman et al. ............. | 180/230 |
| 6,695,083 B2 | * | 2/2004 | Nakamura et al. ......... | 180/68.1 |
| 6,938,676 B2 | * | 9/2005 | Lan et al. ..................... | 165/41 |
| 2002/0112905 A1 | * | 8/2002 | Kitai et al. .................. | 180/68.1 |
| 2003/0029656 A1 | * | 2/2003 | Matsuura et al. ........... | 180/68.2 |
| 2003/0066696 A1 | * | 4/2003 | Nakamura .................. | 180/68.1 |
| 2006/0006010 A1 | * | 1/2006 | Nakamura et al. ......... | 180/68.1 |

FOREIGN PATENT DOCUMENTS

JP 2002-130440 5/2002

\* cited by examiner

*Primary Examiner*—Paul N Dickson
*Assistant Examiner*—John R Olszewski
(74) *Attorney, Agent, or Firm*—Keating & Bennett, LLP

(57) ABSTRACT

A riding type vehicle with improved cooling function of a V-belt continuously variable transmission and a compact body cover. A front side of a seat is partitioned with a space recessed to a lower side. The inside of a vehicle body cover is partitioned with a center tunnel. An engine unit is supported by a vehicle body frame on a lower side of the recessed space. The engine unit includes a transmission case having a belt chamber containing the V-belt continuously variable transmission. A footrest is arranged on an outer side in a vehicle width direction of the transmission case. An intake duct that guides air for cooling the V-belt type continuously variable transmission is disposed on an outer side in a vehicle width direction of the center tunnel and on an upper side of the transmission case.

16 Claims, 14 Drawing Sheets

RIDING TYPE VEHICLE

RELATED APPLICATIONS

This application claims the benefit of priority under 35 USC 119 of Japanese patent application no. 2005-222919, filed on Aug. 1, 2005, and Japanese patent application no. 2006-182021, filed on Jun. 30, 2006, which applications are hereby incorporated by reference in their entirety.

BACKGROUND OF THE INVENTION

1. Field of the Invention

The present invention relates to a riding type vehicle having a V-belt continuously variable transmission.

2. Description of Related Art

Motorcycles having a V-belt continuously variable transmission are well known (refer to, for example, JP-A-2002-130440).

The V belt of a V-belt type continuously variable transmission increases in temperature during travel due to friction heat and the like. Hence, a method of forcibly cooling the V belt by supplying air to a belt chamber containing the V belt from outside is often used.

The motorcycle disclosed in JP-A-2002-130440 includes a vehicle body frame substantially in a V-like shape as viewed from the side. The body frame is covered by a body cover, and an engine is disposed at a valley portion of the V-like shaped body frame. The body frame has a front side inclined portion inclined in a front upward direction from the valley portion, and a rear side inclined portion inclined in a rear upward direction from the valley portion.

The motorcycle includes an intake duct for introducing air to the belt chamber, and an exhaust duct for discharging air in the belt chamber to the outside. The intake duct extends substantially on a straight line along the front side inclined portion of the body frame towards a position in front of a head pipe. The exhaust duct extends substantially on a straight line along the rear side inclined portion of the vehicle body frame towards a position above a rear wheel. Thus, the intake duct and the exhaust duct are disposed along the substantially V-like shape of the body frame.

However, according to JP-A-2002-130440, the intake duct and the exhaust duct are disposed along the body frame inside of the body cover. Therefore, the body cover is increased in size by an amount corresponding to the intake duct and the exhaust duct. On the other hand, when the intake duct and the exhaust duct are decreased in diameter to downsize the body cover, a sufficient cross-section of the air flow path inside of the intake duct and the exhaust duct cannot be provided, and the function of cooling the V-belt type continuously variable transmission is deteriorated.

SUMMARY OF THE INVENTION

The present invention has been carried out in view of these circumstances, and it is an object thereof to provide both improved cooling of a V-belt type continuously variable transmission and downsizing of the body cover.

A riding type vehicle according to the invention has a frame, a seat and a recessed space on a front side of the seat. The vehicle has a vehicle body cover covering the frame and defining the recessed space on an outer side thereof and a center tunnel on an inner side thereof. An engine unit is supported by the frame on a lower side of the recessed space and includes an engine, a transmission case formed with a belt chamber, and a V-belt continuously variable transmission contained in the belt chamber. An air path disposed on an outer side in a vehicle width direction of the center tunnel and above the transmission case communicates with the belt chamber. An upper end of the air path is lower than a lower end of the recessed space.

According to the invention, the air path communicating with the belt chamber is disposed at a space on the outer side in the vehicle width direction of the center tunnel and above the transmission case and therefore, the space is effectively utilized as a space of installing the air path. Therefore, even when the vehicle body cover is not upsized, an air path having a sufficient flow path sectional area is formed. Therefore, improved cooling of the V-belt continuously variable transmission and downsizing of the vehicle body cover are made compatible. Further, the upper end of the air path is lower than the lower end of the recessed space on the front side of the seat. Therefore, arrangement of the air path can be carried out or facilitated.

Another riding type vehicle according to the invention comprises a frame, an engine unit supported by the frame and including an engine, a transmission case formed with a belt chamber, and a V-belt continuously variable transmission contained in the belt chamber. A foot mounting member is disposed on an outer side in a vehicle width direction of the transmission case. An air path is disposed on an upper side of the transmission case for communicating with the belt chamber. An outer side end in the vehicle width direction of the air path is disposed on an inner side of an inner side end in the vehicle width direction of the foot mounting member.

In the riding type vehicle, the air path communicating with the belt chamber is disposed at a space above the transmission case and therefore, the space is effectively utilized as the space of installing the air path. Therefore, improved cooling of the V-belt type continuously variable transmission and downsizing of the vehicle body cover are made to be compatible with each other. Further, the air path is not projected to an outer side in the vehicle width direction as much as the foot mounting member and therefore, slim formation of the vehicle is improved.

According to the invention, in a riding type vehicle including a V-belt continuously variable transmission, improved cooling function of the V-belt continuously variable transmission and downsizing of the vehicle cover are both provided.

Other features and advantages of the invention will be apparent from the following detailed description, taken in conjunction with the accompanying drawings which illustrate, by way of example, various features of embodiments of the invention.

DETAILED DESCRIPTION OF THE INVENTION

A detailed explanation of embodiments of the invention in reference to the drawings is set forth below.

First Embodiment

Figure 1:
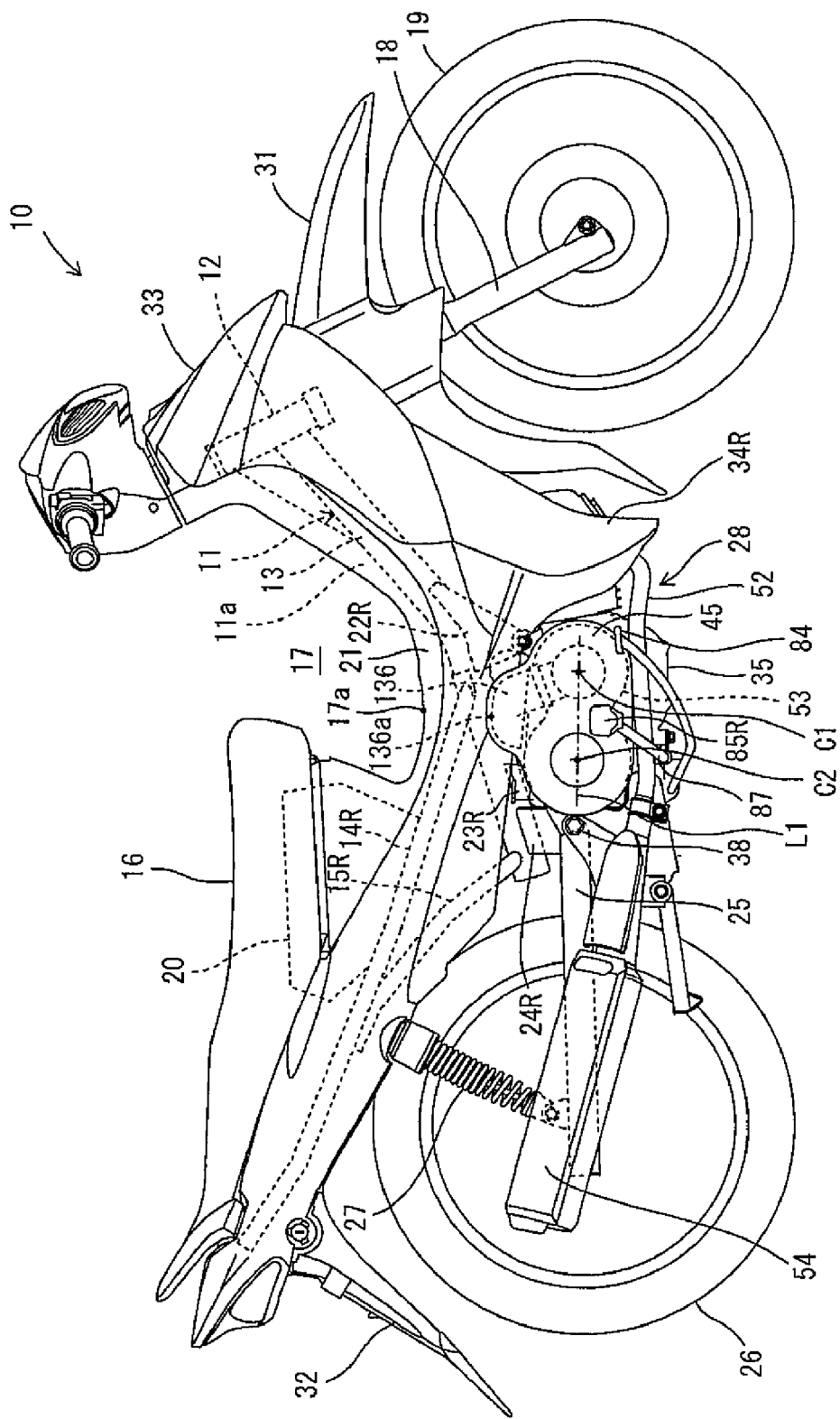
FIG. 1 is a side view of a motorcycle according to a first embodiment of the invention.

As shown by FIG. 1, a riding type vehicle according to the first embodiment of the invention is a motorcycle 10. The motorcycle 10 includes a body frame 11 and a seat 16 on which a passenger is seated. The motorcycle 10 is a so-called moped type motorcycle. That is, the motorcycle 10 is formed with a downward-recessed space 17 on a front side of the seat 16, and the passenger seated on the seat 16 straddles body frame 11. The 'moped type' mentioned here indicates only a shape of the vehicle, and does not limit the maximum speed, exhaust amount, the size of the vehicle and so on.

The riding type vehicle according to the invention is not limited to a moped but may be another type of motorcycle in which a fuel tank is disposed on a front side of the seat.

In the following description, the terms front, rear, left and right denote directions viewed from the perspective of a passenger seated on the seat 16. The body frame 11 includes a steering head pipe 12, a main frame 13 extended in a rear skewed lower direction from the steering head pipe 12, left and right seat rails 14L, 14R extended in a rear skewed upper direction from a middle portion of the main frame 13, and left and right seat pillar tubes 15L, 15R connected between a rear end portion of the main frame 13 and middle portions of the seat rails 14L, 14R.

An upper side and left and right sides of the vehicle body frame 11 are covered by a body cover 21. The downward-recessed space 17 is defined by body cover 21 and a front side of the seat 16. A center tunnel 11a serving as the path of the main frame 13 is provided below the body cover 21.

Steering head pipe 12 supports front wheel 19 with a front fork 18. Seat rails 14L and 14R support fuel tank 20 and the seat 16 thereon. The seat 16 is extended from above the fuel tank 20 to rear end portions of the seat rails 14L, 14R. The fuel tank 20 is disposed on upper sides of front half portions of the seat rails 14L, 14R and is covered by the body cover 21 and the seat 16.

A middle portion of the main frame 13 is provided with a pair of downward projecting left and right first engine brackets 22L, 22R. A rear end portion of the main frame 13 is provided with respective pairs of left and right second engine brackets 23L, 23R and rear arm brackets 24L, 24R. The first engine brackets 22L, 22R, the second engine brackets 23L, 23R, and the rear arm brackets 24L, 24R constitute part of the body frame 11.

The rear arm brackets 24L, 24R project downward from the rear end portion of the main frame 13. The rear arm brackets 24L, 24R are provided with a pivot shaft 38, and a front end portion of a rear arm 25 is pivotably supported by the pivot shaft 38. A rear end portion of rear arm 25 supports rear wheel 26. A rear half portion of the rear arm 25 is suspended by body frame 11 with a cushion unit 27.

Figure 5:
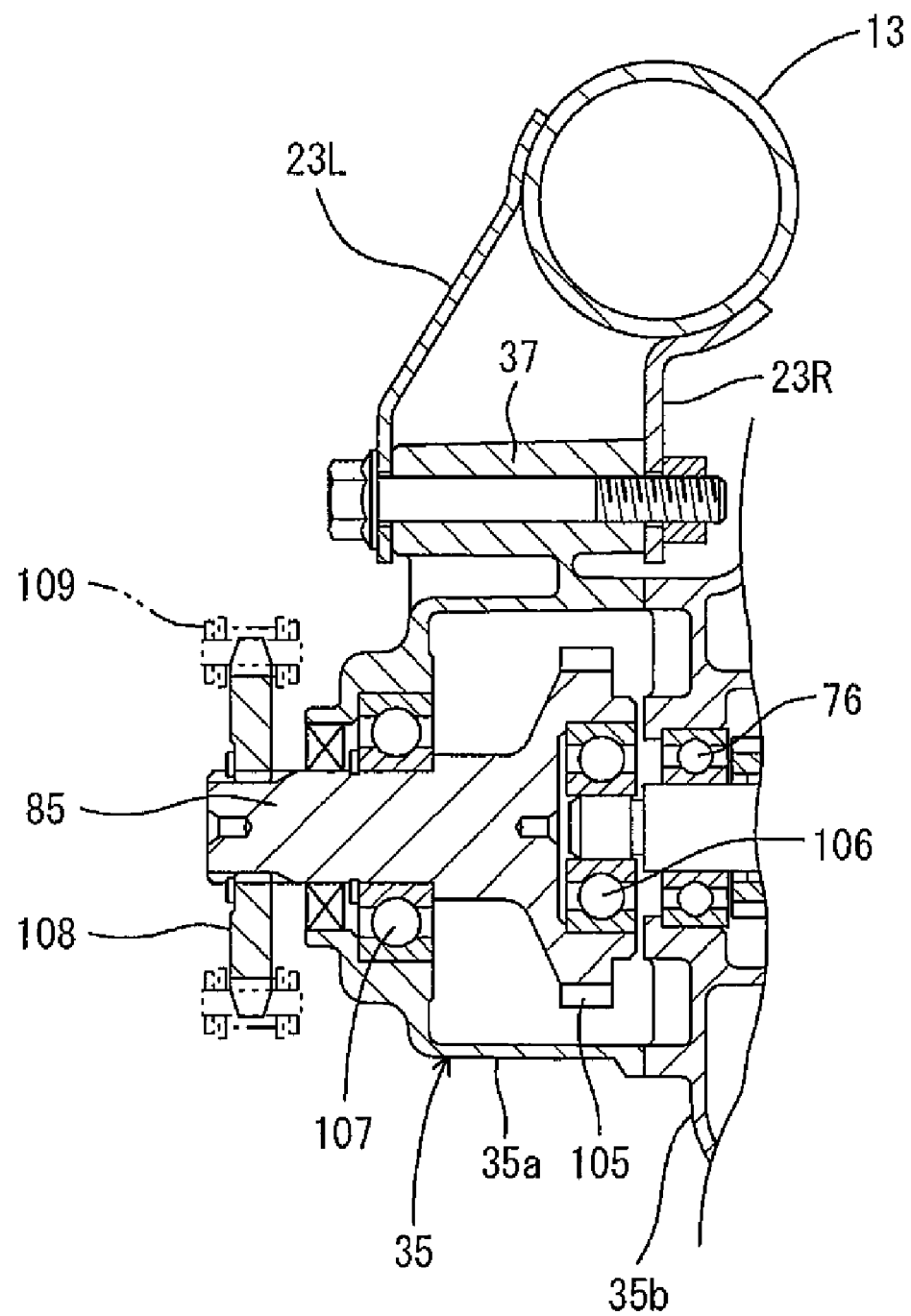
FIG. 5 is a sectional view showing a state of attaching the engine unit.

As shown by FIG. 5, the second engine brackets 23L, 23R project downward from the rear end portion of the main frame 13. The left and right second engine brackets 23L, 23R are opposed to each other with a space therebetween in a vehicle width direction.

Figure 4:
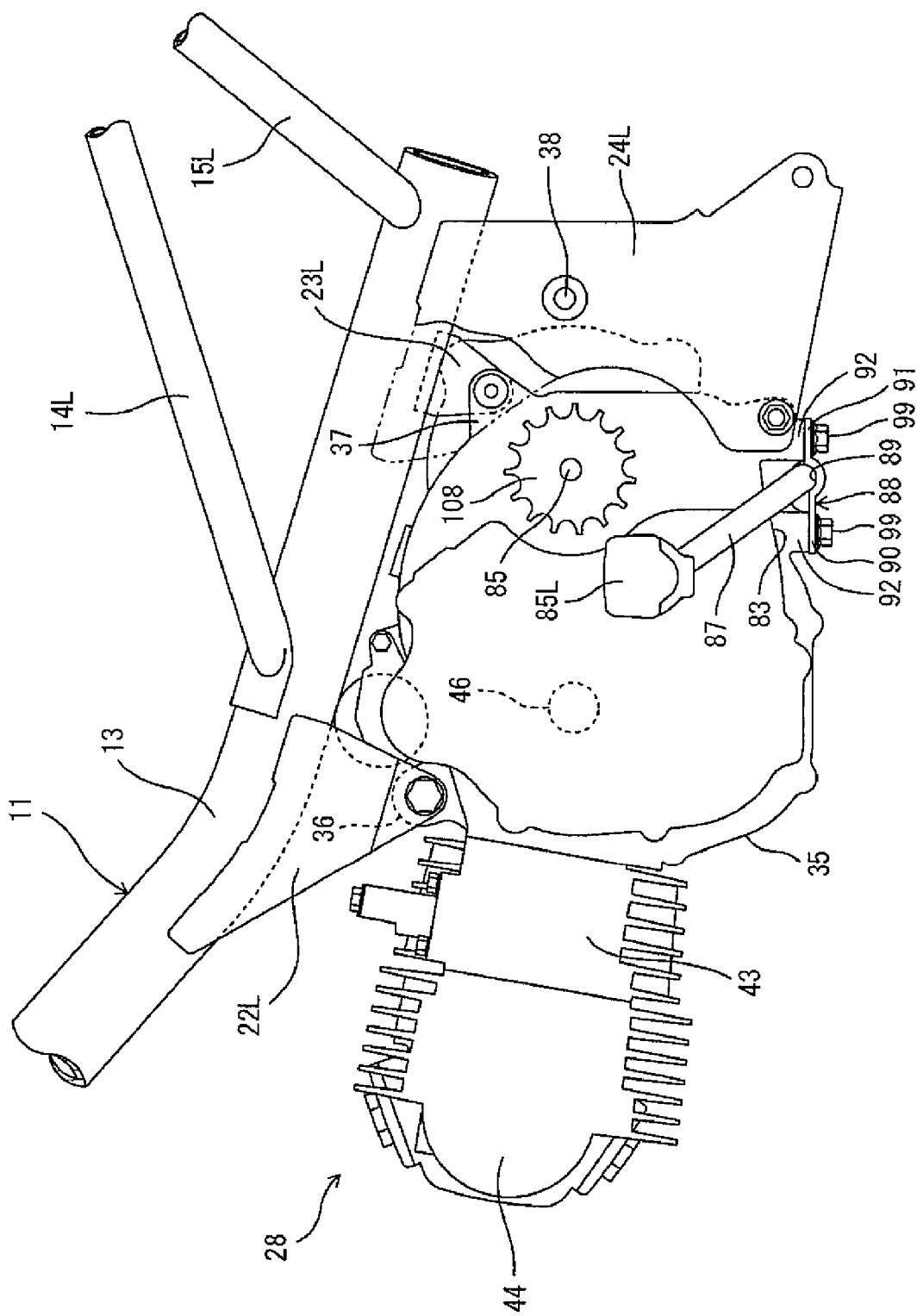
FIG. 4 is a left side view of the engine unit.

As shown by FIG. 1, an engine unit 28 that drives rear wheel 26 is supported by the body frame 11. Specifically, as shown by FIG. 4, the engine unit 28 includes a crankcase 35, a cylinder 43 and a cylinder head 44. The crankcase 35 includes first and second engine mount portions 36, 37. The first engine mount portion 36 projects upward from an upper side of a front end portion of the crankcase 35 and is supported by the first engine brackets 22L, 22R. The second engine mount portion 37 projects upward in a rear skewed direction from an upper side of a rear end portion of the crankcase 35 and is supported by the second engine brackets 23L, 23R (also refer to FIG. 5). Therefore, the crankcase 35 is suspended by the main frame 13.

The engine unit 28 includes an engine 29 and a belt continuously variable transmission (hereinafter, referred to as CVT) 30 (refer to FIG. 6). Although a type of the engine 29 is not limited, according to the first embodiment, the engine 29 is a 4 cycle single cylinder engine. CVT 30 is covered by a transmission case 53 and the transmission case 53 is covered by a cover 45 (refer to FIG. 1).

Figure 3:
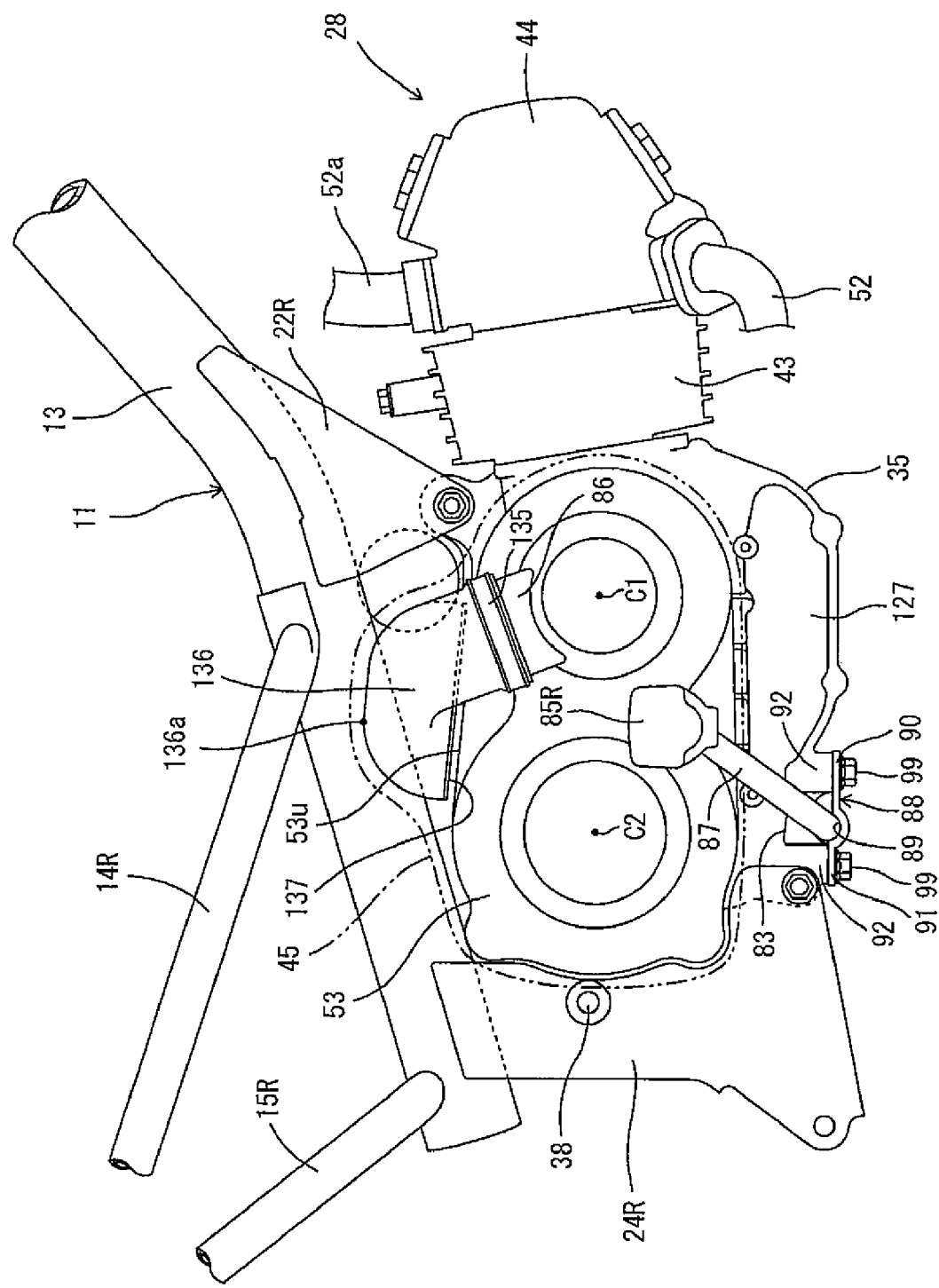
FIG. 3 is a right side view of the engine unit.

As shown by FIG. 3, the transmission case 53 has a connecting tube 86. The connecting tube 86 is connected to a portion of CVT 30 in the transmission case 53 on a side of a primary sheave 71, in other words, a front half portion of the transmission case 53 (refer to FIG. 6). The connecting tube 86 extends in a rear skewed upward direction.

Figure 9:
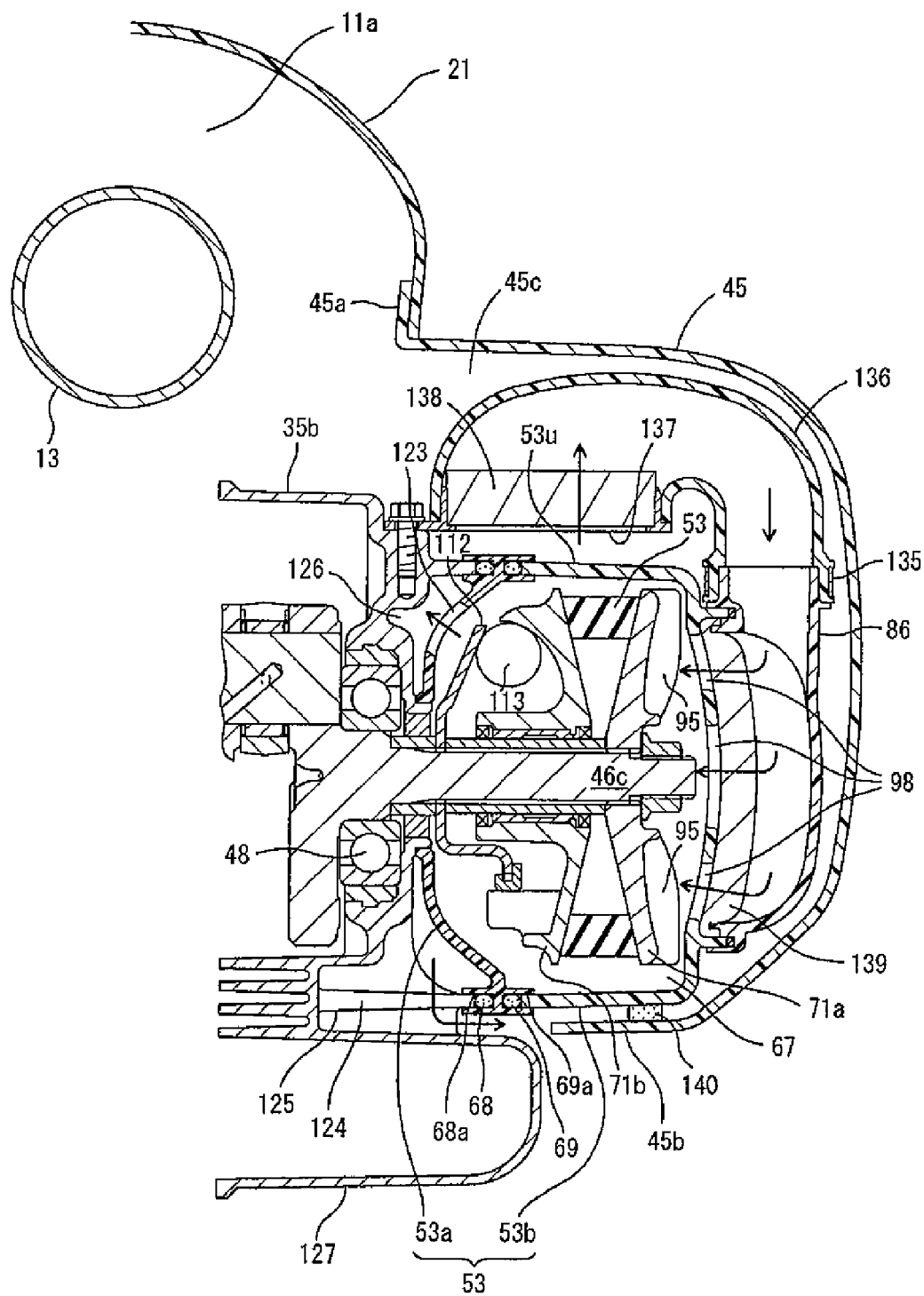
FIG. 9 is a sectional view inside of the transmission case and an intake duct.

The connecting tube 86 connects to an intake duct 136. As shown by FIG. 3 and FIG. 9, the intake duct 136 is a tube bent to a lower side after being extended in a skewed upward direction temporarily, here, bent by about 180 degrees. An intake port 137 opened downward is formed on an inner side in the vehicle width direction of the intake duct 136. The intake port 137 is opposed to an upper face portion 53u of the transmission case 53. Further, the upper face portion 53u is inclined from a horizontal face. Specifically, the upper face portion 53u of the transmission case 53 is inclined in a front downward direction. However, the upper face portion 53u can also be inclined in the front upward direction, or can be in a horizontal state.

Figure 2:
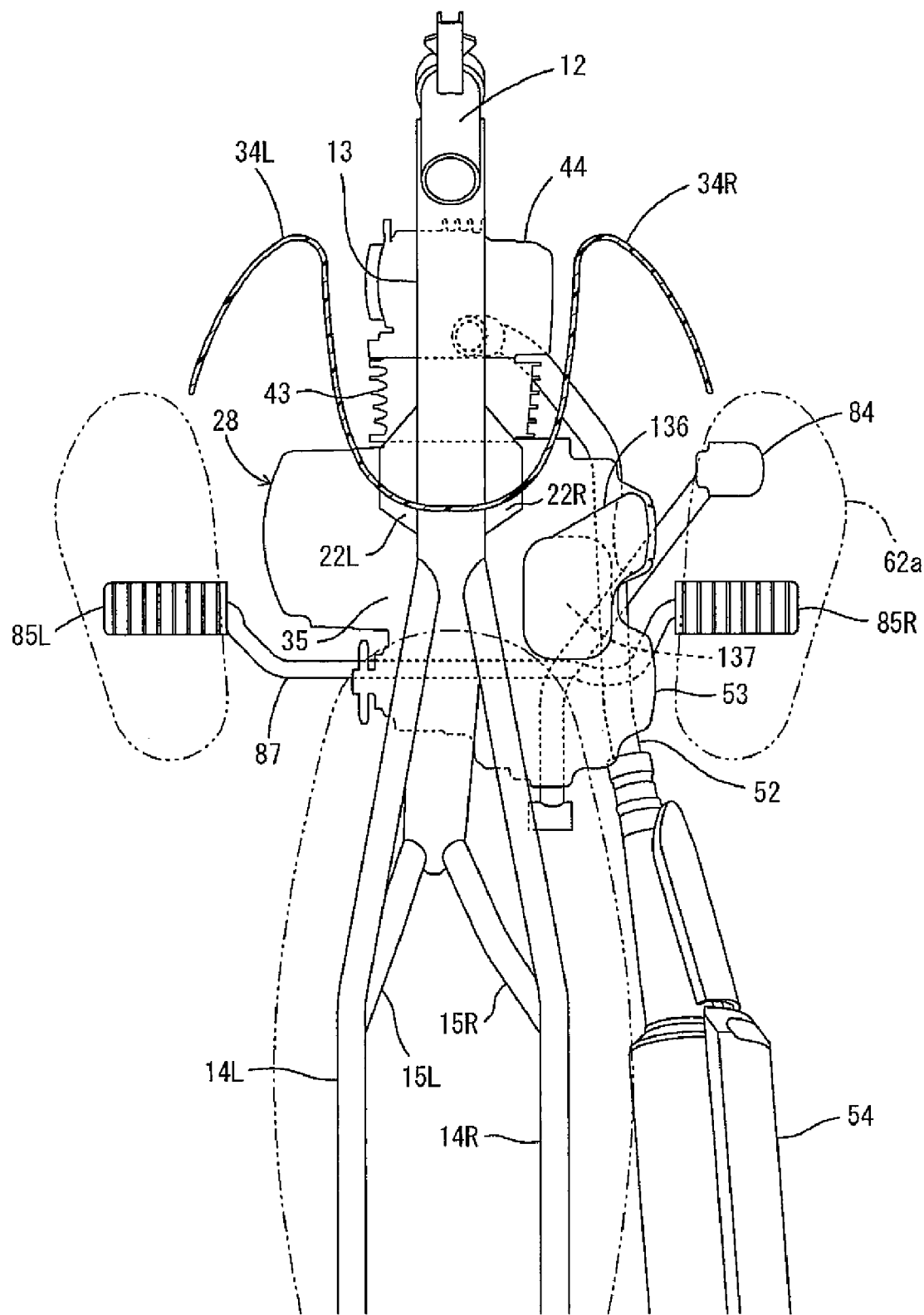
FIG. 2 is a plane view showing a positional relationship among a vehicle body frame, an engine unit, and an exhaust duct or the like of the motorcycle.

As shown by FIG. 2, the intake port 137 is a shape in which a length in the left and right direction is shorter than a length in the front and rear direction. Thereby, slim formation of the motorcycle 10 is achieved. According to the embodiment, the intake port 137 has a substantially rectangular shape in a plane view. However, the shape of the intake port 137 is not limited and may be other shapes such as an elliptical shape, a circular shape or the like. As shown by FIG. 3, the intake port 137 is disposed between an axis center C1 of a primary sheave shaft 46c (refer to FIG. 6) of CVT 30 and an axis center C2 of a secondary sheave shaft 62 (refer to FIG. 6) in the front and rear direction.

As shown by FIG. 2, the length in the front and rear direction of the intake duct 136 is shorter than the length in the front and rear direction of transmission case 53. In a plane view, a right end of the transmission case 53 and a right end of the intake duct 136 are disposed at substantially aligned positions. Therefore, the intake duct 136 is not projected in a side direction from the transmission case 53 to assist in achieving slim formation of the motorcycle 10.

Although the connection of intake duct 136 and connecting tube 86 is not limited, according to the embodiment, the intake duct 136 and the connecting tube 86 are fixed by a strap 135 (refer to FIG. 3). However, the connecting tube 152 and the intake duct 153 may be screwed to each other, bonded to each other or integrated with each other.

As shown by FIG. 9, a first filter 138 is attached to an inner side of the intake port 137 of the intake duct 136. A second filter 139 is attached to an inner portion of the connecting tube 86. Although the first filer 138 and the second filter 139 may be of the same kind, according to the embodiment, the second filter 139 is a filter having a mesh finer than that of the first filter 138. Further, the filters may be installed at any portions of the intake path, and the installing positions are not limited. Further, a number of pieces of filters are not limited. For example, either one of the first filter 138 and the second filter 139 can be omitted.

The cover 45 covers both the transmission case 53 and the intake duct 136. Air in an inner space 45c of the cover 45 is sucked from the intake port 137 of the intake duct 136. An upper end portion 45a of the cover 45 is bent upwards and overlaps a portion of the body cover 21. Further, the cover 45 and the body cover 21 may overlap each other directly, or overlap each other by way of a seal member or the like. A lower end portion 45b of the cover 45 overlaps the transmission case 53 by way of a seal member 140.

The inner space 45c of cover 45 communicates with center tunnel 11a. In particular, according to the embodiment, the inner space 45c of the cover 45 and the center tunnel 11a are continuous on a lower side of the upper end portion 45a of the cover 45. The intake duct 136 is arranged in the inner space 45c of the cover 45 and is disposed on an outer side in the vehicle width direction of the center tunnel 11a. Further, a boundary between inner space 45c of cover 45 and center tunnel 11a can be set in accordance with a shape of body cover 21 or the cover 45 or the like. For example, the boundary may be an imaginary vertical face passing a right end portion of the body cover 12 or a left end portion of the cover 45.

According to the embodiment, the cover 45, the intake duct 136 and the connecting tube 86 are formed by resin materials. However, the materials are not limited and may be formed by other materials.

As shown by FIG. 1, the motorcycle 10 includes a front fender 31 covering an upper side and a rear side of the front wheel 19, and a rear fender 32 covering a rear skewed upper side of the rear wheel 26.

The motorcycle 10 includes a front cowl 33, left and right leg shields 34L, 34R in addition to the body cover 21. The leg shields 34L, 34R cover front sides of leg portions of a driver and extend in a skewed up and down direction in a view from a side direction. Further, the leg shields 34L, 34R may be integrated to or separate from the front cowl 33.

As shown by FIG. 2, leg shields 34L, 34R have a sectional, recessed shape opened to the rear. In other words, a cross-sectional shape of the leg shields 34L, 34R is substantially a C-like shape converging to the front side.

However, the specific shape of the leg shields 34L, 34R is not limited. Although the leg shields 34L, 34R of the embodiment are formed in a bent plate shape, the leg shields 34L, 34R may be formed in a flat plate shape. Further, although a width in a left and right direction of the leg shields 34L, 34R of the embodiment increases from the front side to the rear side, the left and right width may be constant. Further, leg shields 34L, 34R are not necessarily extended in the skewed up and down direction, but may be extended in the up and down direction. The leg shields 34L, 34R may be extended in a linear line, or may be extended in a curved line in a side view. Further, portions of the leg shields 34L, 34R may be extended in a linear line and portions may be extended in a curved line.

According to the embodiment, the leg shields 34L, 34R are formed by a resin material. However, the material of the leg shields 34L, 34R is not limited.

Although a length in a longitudinal direction of the leg shields 34L, 34R is not limited, lower ends of the leg shields 34L, 34R are preferably disposed on the lower side of the upper end of the transmission case 53. Further, the lower ends of the leg shields 34L, 34R are preferably disposed on the lower side at a middle position in the up and down direction of the transmission case 53 (a line L1 connecting the center C1 of the primary sheave shaft 46C and the center C2 of the secondary sheave shaft 62 (refer to FIG. 1)), according to the embodiment, the lower ends are disposed on the lower side of the lower end of the transmission case 53.

As shown by FIG. 2, the intake duct 136 is disposed on the right side of the body frame 11 and on the rear side of the leg shield 34R on the right side. The leg shield 34R is extended on an outer side (right side) in the vehicle width direction of the intake duct 136.

Footrests 85L, 85R, of rubber of the like, are disposed on the left and right sides of the engine unit 28. The footrests 85L, 85R support the feet of the driver. Footrests 85L, 85R are supported by a crankcase 35 of the engine unit 28 by a connecting rod 87 made of a metal and attaching plates 88 (refer to FIG. 3 and FIG. 4) fixed to the connecting rod 87.

The connecting rod 87 passes through the lower side of the rear half portion of the crankcase 35 to extend across the vehicle width. A left end of the connecting rod 87 projects to the left side of the crankcase 35 to support the left footrest 85L. A right end of the connecting rod 87 projects to the right side of the transmission case 53 to support right footrest 85R. As shown by FIG. 3, the attaching plate 88 is a pressed metal plate formed with a recess portion 89 for fitting the connecting rod 87 at a middle portion in the front and rear direction of plate 88. The recess portion 89 abuts connecting rod 87 from below and is welded to an outer peripheral face of the connecting rod 87.

The attaching plate 88 includes a flange-like first attaching portion 90 extending to the front side of the connecting rod 87, and a flange-like second attaching portion 91 extending to the rear side of the connecting rod 87. The first attaching portion 90 and the second attaching portion 91 extend in an axial direction (left and right direction) of connecting rod 87 and oppose a lower face 83 of the rear half portion of the crankcase 35.

The lower face 83 of the rear half portion of the crankcase 35 has four boss portions 92 (only two are shown in FIG. 3). The boss portions 92 project downward from the lower face 83 of the crankcase 35 and are integrally formed with the crankcase 35. Boss portions 92 are formed with bolt holes (not shown). The attaching plate 88 of footrests 85L, 85R have bolt holes (not shown) at positions in correspondence with the boss portions 92. The attaching plate 88 and the boss portion 92 are fastened by a bolt 99. Thus, footrests 85L, 85R are fixed to crankcase 35 by the bolts 99 with the connecting rod 87 and the attaching plates 88.

As shown by FIGS. 1 and 2, a brake pedal 84 is disposed on the front side of right footrest 85R. The brake pedal 84 passes below transmission case 53 in a right skewed front direction and extends in a front skewed upper direction on the right side of the transmission case 53. As shown by FIG. 2, in running the motorcycle 10, the right foot 62a of the driver is contiguous to the transmission case 53 and the intake duct 136 in the vehicle width direction. Further, the cover 45 (refer to FIG. 1) is contiguous to the right foot 62a in the vehicle width direction although illustration thereof is omitted in FIG. 2.

Foot mounting members are not limited to the footrests 85L, 85R but may be constituted by other members such as, for example, foot mounting members of a board type or the like.

The inner structure of the engine unit 28 will now be explained. As shown by FIG. 6, the engine unit 28 includes the engine 29, CVT 30, a centrifugal type clutch 41, and a speed reduction mechanism 42.

The engine 29 includes the crankcase 35, the cylinder 43 connected to the crankcase 35, and the cylinder head 44 connected to the cylinder 43. The crankcase 35 includes two divided case blocks, that is, a first case block 35a on the left side and a second case block 35b on the right side. The first case block 35a and the second case block 35b are opposed to each other along the vehicle width direction.

Crankcase 35 contains a crankshaft 46. The crankshaft 46 extends horizontally in the vehicle width direction. The crankshaft 46 is supported by the first case block 35a with a bearing 47, and is supported by the second case block 35b with a bearing 48.

A piston 50 is slidably inserted into the cylinder 43. The piston 50 connects to one end portion of a connecting rod 51. A crankpin 59 is provided between a left side crank arm 46a and a right side crank arm 46b of the crankshaft 46. The other end portion of the connecting rod 51 is connected to the crankpin 59.

The cylinder head 44 has a recess portion 44a, and an intake port and an exhaust port (not shown) communicating with the recess portion 44a. An ignition (spark) plug 55 is inserted in the inner portion of the recess portion 44a of the cylinder head 44. As shown by FIG. 3, the intake port connects to intake pipe 52a, and the exhaust port connects to exhaust pipe 52. As shown by FIGS. 1 and 2, the exhaust pipe 52 extends to the rear in a right skewed downward direction from the cylinder head 44, thereafter, and passes below transmission case 53 into connection with a muffler 54 on a right side of the rear wheel 26.

Figure 6:
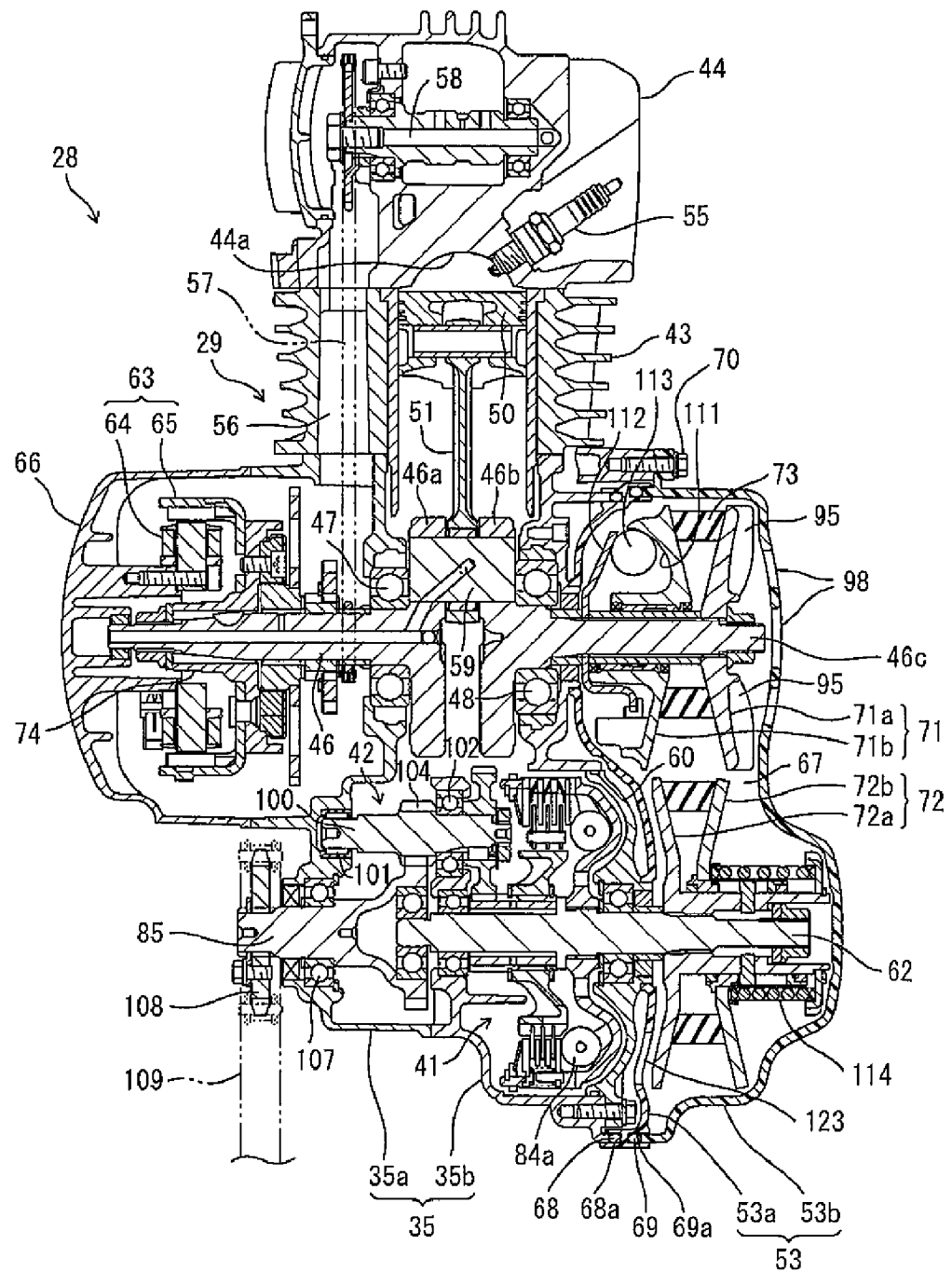
FIG. 6 is a sectional view showing an inner structure of the engine unit.

As shown by FIG. 6, a left side portion of cylinder 43 has a cam chain chamber 56 for connecting the interior of crankcase 35 with the interior of cylinder head 44. The cam chain chamber 56 has a timing chain 57 that wraps around crankshaft 46 and a cam shaft 58. The cam shaft 58 rotates with rotation of the crankshaft 46 for opening and closing an intake valve and an exhaust valve (not shown).

A generator case 66 for a generator 63 is detachably mounted to a left side of a front half portion of the first case block 35a. The transmission case 53 for CVT 30 is attached to a right side of the second case block 35b.

An opening formed on a right side of a rear half portion of the second case block 35b is closed by a clutch cover 60. The clutch cover 60 is detachably fixed to the second case block 35b by a bolt 61 (refer to FIG. 7).

The transmission case 53 is separate from crankcase 35 and comprises an inner side case 53a covering the inner side (left side) in the vehicle width direction of CVT 30, and an outer side case 53b covering an outer side (right side) in the vehicle width direction of CVT 30. The inner side case 53a is attached to a right side of the crankcase 35, and the outer side case 53b is attached to a right side of the inner side case 53a. A belt chamber 67 for containing CVT 30 is formed at inner portions of the inner side case 53a and the outer side case 53b. Further, the connecting tube 86 is provided at the outer side case 53b.

As shown by FIG. 6, a right side end portion of the crankshaft 46 passes through the second case block 35b and the inner side case 53a into belt chamber 67. The primary sheave 71 of CVT 30 is fitted to the right side end portion of the crankshaft 46 and rotates with rotation of the crankshaft 46. A right side portion of the crankshaft 46 (strictly speaking, a portion on a right side of the bearing 48) is formed with the primary sheave shaft 46c.

On the other hand, a left side end portion of the crankshaft 46 passes through the first case block 35a and into generator case 66. The left side end portion of the crankshaft 46 is attached to generator 63. The generator 63 includes a rotor 65 facing a stator 64. The rotor 65 is fixed to a sleeve 74 that rotates with the crankshaft 46. The stator 64 is fixed to the generator case 66.

Figure 7:
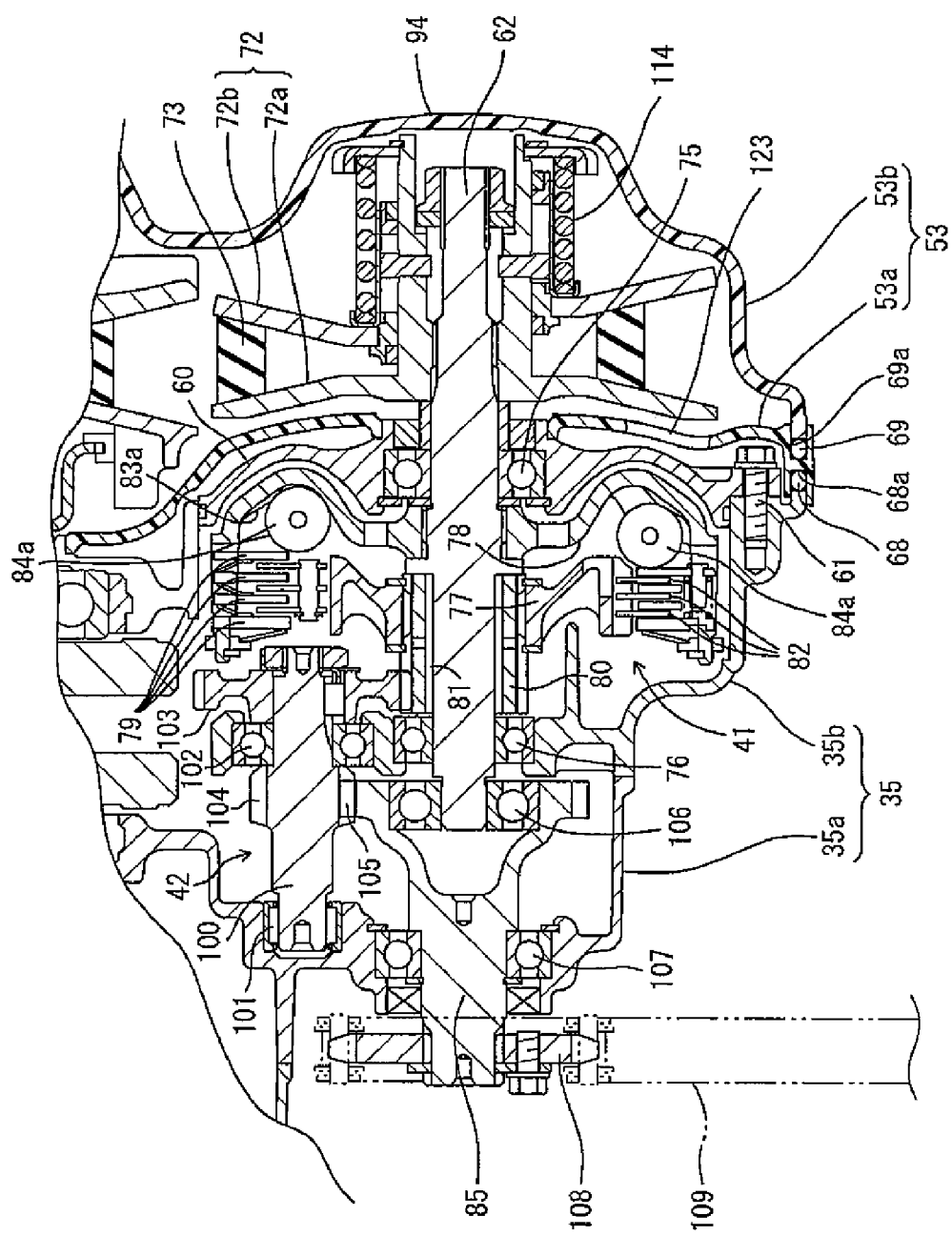
FIG. 7 is a sectional view showing an inner structure of a portion of the engine unit.

A rear half portion of crankcase 35 contains a secondary sheave shaft 62 in parallel with the crankshaft 46. As shown by FIG. 7, a right side portion of a center portion of the secondary sheave shaft 62 is supported by the clutch cover 60 with a bearing 75. A left side portion of the secondary sheave shaft 62 is supported by a left end portion of the second case block 35b with a bearing 76. A right side end portion of the secondary sheave shaft 62 passes through the second case block 35b and the clutch cover 60 into belt chamber 67. The right side end portion of the secondary sheave shaft 62 connects to a secondary sheave 72 of CVT 30.

As shown by FIG. 6, CVT 30 includes the primary sheave 71, the secondary sheave 72 and a V belt 73 wrapped around the primary sheave 71 and the secondary sheave 72. As described above, the primary sheave 71 is attached to the right side portion of the crankshaft 46. The secondary sheave 72 is connected to the right side portion of the secondary sheave shaft 62.

The primary sheave 71 includes a fixed sheave half 71a disposed on an outer side in the vehicle width direction and a movable sheave half 71b disposed on an inner side in the vehicle width direction and opposed to the fixed sheave half 71a. The fixed sheave half 71a is fixed to a right end portion of the primary sheave shaft 46c and rotates with the primary sheave shaft 46c. The movable sheave half 71b is arranged on a left side of the fixed sheave half 71a and is slidably attached to the primary sheave shaft 46c. Therefore, the movable sheave half 71b rotates with the primary sheave shaft 46c and is slidable in an axial direction of the primary sheave shaft 46c. A belt groove is formed between the fixed sheave half 71a and the movable sheave half 71b. A cam face 111 is formed on a left side portion of the movable sheave half 71b, and a cam plate 112 is arranged on a left side of the cam face 111. A roller weight 113 is disposed between the cam face 111 of the movable sheave half body 71b and the cam plate 112.

A plurality of intake ports 98 are formed at a portion of the outer side case 53b on an outer side of the primary sheave 71. As shown by FIG. 9, the intake port 98 is an opening for communicating inside of the connecting tube 86 and the belt chamber 67. According to the embodiment, the intake port 98 is opened to a right side portion of the fixed sheave half 71a.

A plurality of blades 95 for blowing wind are formed on a right side portion of the fixed sheave half 71a of the primary sheave 71. The blades 95 guide air from the intake duct 136 to the belt chamber 67 and transport air in the belt chamber 67 to outside. According to the embodiment, the blade 95 extends spirally from a center portion to an outer side of the fixed sheave half 71a in a side view. However, the specific shape and number of blades 95 is not limited. Further, an outer side of the fixed sheave half 71a may be provided with a vane wheel or the like separately from the fixed sheave half 71a.

Such a member corresponds to 'blade for blowing wind formed on an outer side of the fixed sheave half 71a'.

The secondary sheave 72 includes a fixed sheave half 72a disposed on an inner side in the vehicle width direction, and a movable sheave half 72b disposed on an outer side in the vehicle width direction and opposed to the fixed sheave half 72a. The movable sheave half 72b is attached to a right end portion of the secondary sheave shaft 62. The movable sheave half 72b rotates with the secondary sheave shaft 62 and is slidable in an axial direction of the secondary sheave shaft 62. A compression coil spring 114 is disposed at a right end of the secondary sheave shaft 62 and exerts a leftward biasing force on the movable sheave half 72b. An axis center portion of the fixed sheave half 72a is a cylindrical slide collar, and is fitted to the secondary sheave shaft 62 by a spline.

According to the embodiment, a diameter of the secondary sheave 72 is larger than that of the primary sheave 71. Specifically, diameters of the fixed sheave half 72a and the movable sheave half 72b are larger than those of the fixed sheave half 71a and the movable sheave half 71b.

In CVT 30, a speed reduction ratio is determined by the magnitude relationship between a rightward force of roller weight 113 for pushing the movable sheave half 71b of the primary sheave 71, and a leftward force of compression coil spring 114 for pushing the movable sheave half 72b of the secondary sheave 72.

That is, when the rotational speed of primary sheave shaft 46c increases, the roller weight 113 is moved radially outward by centrifugal force and pushes the movable sheave half 71b in the right direction. Then, the movable sheave half 71b is moved to a right side to increase the belt wrap diameter on the primary sheave 71. Thus, the belt wrap diameter on the secondary sheave 72 decreases, and the movable sheave half 72b of the secondary sheave 72 is moved to the right side against the urge force of the compression coil spring 114. As a result, the belt wrap diameter of the primary sheave 71 for V belt 73 is increased, while the belt wrap diameter of secondary sheave 72 for V belt 73 is reduced, and the speed reduction ratio is reduced.

On the other hand, when the rotational speed of primary sheave shaft 46c decreases, the centrifugal force of the roller weight 113 is reduced. Thus, the roller weight 113 moves radially inward along the cam face 111 of the movable sheave half 71b and the cam plate 112. The rightward force of roller weight 113 pushing the movable sheave half 71b is therefore reduced. Then, the urge force of compression coil spring 114 exceeds the rightward force and moves sheave half 72b of the secondary sheave 72 leftward, and accordingly, the movable sheave half 71b of the primary sheave 71 also moves leftward. As a result, the belt wrap diameter of primary sheave 71 is reduced, while the belt wrap diameter of secondary sheave 72 is increased, and the speed reduction ratio is increased.

A seal groove 68a is formed on a left side of a peripheral edge portion of the inner side case 53a, and a peripheral edge portion on a right side of the second case block 35b is fitted to the seal groove 68a. An O-ring 68 is inserted between the inner side case 53a and the second case block 35b in the seal groove 68a. A seal groove 69a is formed on a right side of a peripheral edge portion of the inner side case 53a, and a peripheral edge portion of the outer side case 53b is fitted to the seal groove 69a. An O-ring 69 is inserted between the inner side case 53a and the outer side case 53b in the seal groove 69a. The outer side case 53b and the second case block 35b are fastened by a bolt 70 with the inner side case 53a therebetween.

Figure 8:
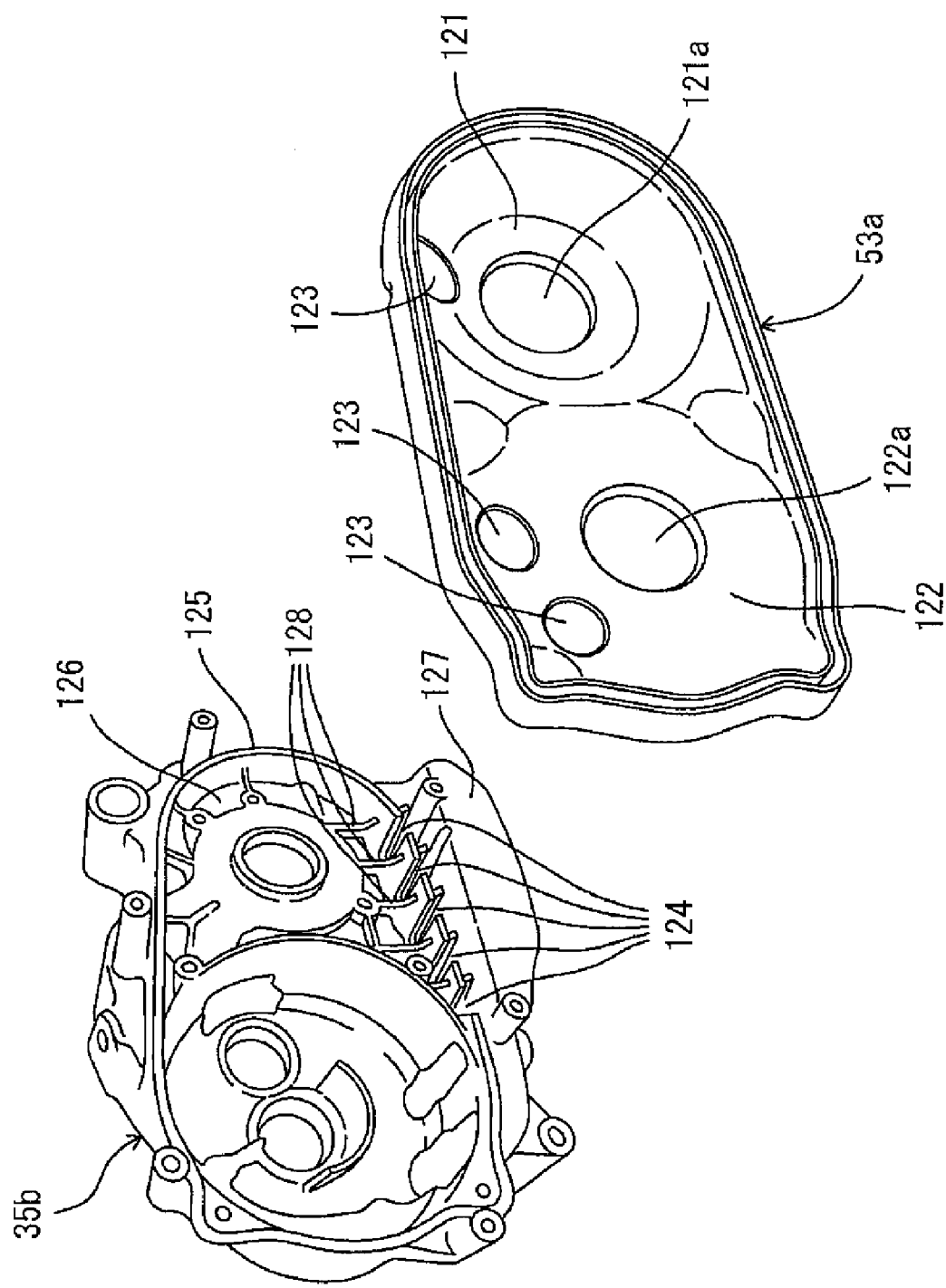
FIG. 8 is a disassembled perspective view of a second case block and an inner side case of a transmission case.

As shown by FIG. 8, a front half portion 121 of the inner side case 53a is formed in a bowl-like shape bulged to the left side, and a rear half portion 122 of the inner side case 53a is formed in a bowl-like shape bulged to the right side. The front half portion 121 has a hole 121a for inserting the primary sheave shaft 46c of CVT 30. The rear half portion 122 has a hole 122a for inserting the secondary sheave shaft 62 of CVT 30. Further, in FIG. 8, the clutch cover 60 (refer to FIG. 6) interposed between the inner side case 53a and the second case block 35b is not illustrated.

The inner side case 53a has a duct 123. According to the embodiment, the duct 123 has a circular shape, and is disposed at three positions higher than the center of the inner side case 53a. However, the shape of the duct 123 is not limited. Duct 123 is not necessarily positioned at the upper side portion of the inner side case 53a. According to the embodiment, the ducts 123 are provided at both the front half portion 121 and the rear half portion 122 of the inner side case 53a. However, the duct 123 may be formed only at one of the front half portion 121 and the rear half portion 122. Also, the number of ducts 123 is not limited.

A plurality of ducts 124 are formed on a lower side of a right side portion of the second case block 35b. Specifically, the second case block 35b includes a peripheral edge portion 125 erected to direct to the right side and the peripheral edge portion 125 has a shape corresponding to a shape of a contour of the transmission case 53. Further, a lower side of the peripheral edge portion 125 is cut off into slits to define a comb-like shape. Therefore, a space 126 defined by second case block 35b and inner side case 53a communicates with the outside of the engine unit 28 via ducts 124. Since the right side of the rear half portion of the second case block 35b is covered by clutch cover 60, the space 126 at the rear half portion of the second case block 35b is formed between clutch cover 60 and the inner side case 53a.

The comb-like portion of the peripheral edge portion 125 has a reinforcing rib 128. An oil pan 127 is provided under ducts 124.

With this structure, as shown by FIG. 9, air in belt chamber 67 is guided to the space 126 through duct 123 of the inner side case 53a and is discharged toward oil pan 127 through duct 124 of the second case block 35b. As a result, air is discharged outside of the engine unit 28.

According to the embodiment, the lower side of the peripheral edge portion 125 of the second case block 35b is shaped like a comb to form a plurality of slit-like ducts 124. Duct 124 is not limited to a slit-like shape but may be other shapes such as circular. The shape, size and number of ducts 124 of the second case block 35b is not limited.

As shown by FIG. 7, a centrifugal type clutch 41 is attached to a left side of the secondary sheave shaft 62. The centrifugal type clutch 41 is a wet multiplate clutch and includes a cylindrical clutch housing 78 and a clutch boss 77. The clutch housing 78 is fitted to the secondary sheave shaft 62 by a spline, and rotates with the secondary sheave shaft 62. The clutch housing 78 is attached with a plurality of clutch plates 79 in a ring-like shape. The clutch plates 79 are spaced at intervals along the axial direction of the secondary sheave shaft 62.

A cylindrical gear 80 is rotatably fitted with a bearing 81 around a left side portion of the secondary sheave shaft 62. The clutch boss 77 is disposed radially inside clutch plate 79 and radially outside gear 80, and is in engagement with gear 80. Thus, gear 80 rotates with the clutch boss 77. A plurality of ring-shaped friction plates 82 are attached radially outside clutch boss 77. The friction plates 82 are spaced at intervals along the axis of the secondary sheave shaft 62 and are disposed between the adjacent clutch plates 79, 79.

A left side of the clutch housing 78 is formed with a plurality of cam faces 83a. A roller weight 84a is arranged between the cam face 83a and the clutch plate 79 on the rightmost side opposed to the cam face 83.

According to the centrifugal type clutch 41, a clutch in state (connected state) and a clutch off state (disconnected state) are automatically switched depending on the magnitude of a centrifugal force applied to the roller weight 84a.

That is, when a rotational speed of the clutch housing 78 equals or exceeds a predetermined speed, the roller weight 84a is moved radially outwardly by centrifugal force to push clutch plates 79 in a left direction. As a result, the clutch plate 79 and the friction plate 82 are brought into press contact with each other to bring about the clutch in state of transmitting a drive force of the secondary sheave shaft 62 to an output shaft 85 via the centrifugal type clutch 41.

On the other hand, when the rotational speed of the clutch housing 78 is less than the predetermined speed, the centrifugal force applied to the roller weight 84a is reduced, and the roller weight 84a moves radially inward. As a result, the clutch plate 79 and the friction plate 82 are released from being in press contact to bring about the clutch off state in which the drive force of the secondary sheave shaft 62 is not transmitted to the output shaft 85. In FIG. 7, a front side (upper side of FIG. 7) portion of the centrifugal type clutch 41 represents the clutch off state, and a rear side (lower side of FIG. 7) portion represents the clutch in state.

The speed reduction mechanism 42 is interposed between the centrifugal type clutch 41 and the output shaft 85. The speed reduction mechanism 42 includes a speed change shaft 100 arranged in parallel with the secondary sheave shaft 62 and the output shaft 85. The speed change shaft 100 is rotatably supported by the first case block 35a with a bearing 101 and is rotatably supported by the second case block 35b with a bearing 102. A right end portion of the speed change shaft 100 is provided with a first speed change gear 103 in engagement with gear 80.

A center portion of the speed change shaft 100 has a second speed change gear 104 smaller in diameter than the first speed change gear 103. An outer peripheral side of a right end portion of the output shaft 85 is formed with a third speed change gear 105 in engagement with the second speed change gear 104. An inner peripheral side of the right end portion of the output shaft 85 is supported by a left end portion of the secondary sheave shaft 62 with a bearing 106. Therefore, the output shaft 85 is rotatably supported by the secondary sheave shaft 62 with the bearing 106 and is arranged coaxially with the secondary sheave shaft 62 (on a linear line). Further, a center portion of the output shaft 85 is rotatably supported by a left end portion of the second case block 35b with a bearing 107.

By such a constitution, the clutch boss 77 and the output shaft 85 are connected by gear 80, the first speed change gear 103, the speed change shaft 100, the second speed change gear 104, and the third speed change gear 105. Therefore, the output shaft 85 rotates with rotation of the clutch boss 77.

A left end portion of the output shaft 85 passes through the first case block 35a and projects outside of the crankcase 35. The left end portion of the output shaft 85 is fixed with a drive sprocket 108. A chain 109 is wrapped on the drive sprocket 108 as a power transmission mechanism for transmitting the drive force of the output shaft 85 to the rear wheel 26. The power transmission mechanism is not limited to the chain 109 but may be a transmission belt, a gear mechanism having a plurality of gears, a drive shaft or the like.

This is the structure of the motorcycle 10. The operation of cooling CVT 30 will now be explained in reference to FIG. 9.

When the engine unit 28 is operated, the primary sheave shaft 46c of CVT 30 rotates, and in accordance therewith, the blade 95 of the fixed sheave half 71a of the primary sheave 71 rotates. As a result, a suction force guides air from the suction duct 136 into the belt chamber 67.

Then, as shown by FIG. 9, air is sucked into the suction duct 136 through suction port 137. The air is cleaned by passing through first filter 138, and then flows into the connecting tube 86. Air which has flowed into the connecting tube 86 is cleaned by passing the second filter 139, and is then sucked into belt chamber 67 by passing the suction port 98. Air sucked into belt chamber 67 flows around and cools primary sheave 71, secondary sheave 72 and V belt 73.

Air which has cooled the primary sheave 71, the secondary sheave 72 and the V belt 73 is discharged from the belt chamber 67 through duct 123 of the inner side case 53a into space 126 between the inner side case 53a and the second case block 35b. Air in space 126 is discharged to the outside of engine unit 28 through duct 124 at the lower portion of the second case block 35b. CVT 30 is continuously cooled by the above-described flow of air.

As described above, according to the embodiment, the intake duct 136 is arranged on the outer side in the vehicle width direction of the center tunnel 11a and on the upper side of the transmission case 53, and an upper end 136a of the intake duct 136 is disposed at a position lower than the lower end 17a of the recessed shape space 17 on the front side of the seat 16 (refer to FIG. 1). Thereby, the space on the outer side in the vehicle width direction of the center tunnel 11a and on the upper side of the transmission case is effectively utilized as a space for installing the air path. Therefore, the space for installing the air path is provided without upsizing body cover 21. As a result, an air path having a sufficient flow path sectional area is realized, and both improved cooling function of CVT 30 and downsizing of body cover 21 are realized. According to the embodiment, improved reliability of CVT 30 and slim formation of motorcycle 10 are compatible.

There is a particularly strong demand for a slim body is in a moped-type motorcycle. Typically, there are a number of restrictions which are not observed in riding type vehicles of other types with regard to the position the air path communicating with the belt chamber. However, according to the invention, improved reliability of CVT 30 and slim formation of the motorcycle are compatible. Therefore, the effect of the invention is achieved particularly significantly. However, the riding type vehicle according to the invention is not limited to the riding type vehicle of the above-described type.

According to the embodiment, the footrest 85R is arranged on the outer side in the vehicle width direction of the transmission case 53, the intake duct 136 is arranged on the upper side of the transmission case 53, and the outer side end (right side end) in the vehicle width direction of the intake duct 136 is disposed on the inner side (left side) of the inner side end (left side end) in the vehicle width direction of the footrest 85R (refer to FIG. 2). Therefore, intake duct 136 is not projected in a side direction as much as footrest 85R and slim formation of the motorcycle 10 is improved.

Further, according to the embodiment, the outer side of the intake duct 136 is covered by the cover 45 opened to the inner side in the vehicle width direction and therefore, water, dust or the like is restrained from flowing into the belt chamber 67 and reliability of CVT 30 is improved.

As shown by FIG. 9, the cover 45 and the body cover 21 partially overlap each other. Therefore, water, dust or the like is restrained from invading inside of the cover 45 from a gap between the cover 45 and the body cover 21. Therefore, water, dust or the like is further restrained from flowing into the belt chamber 67 and reliability of CVT 30 is further improved.

Figure 10:
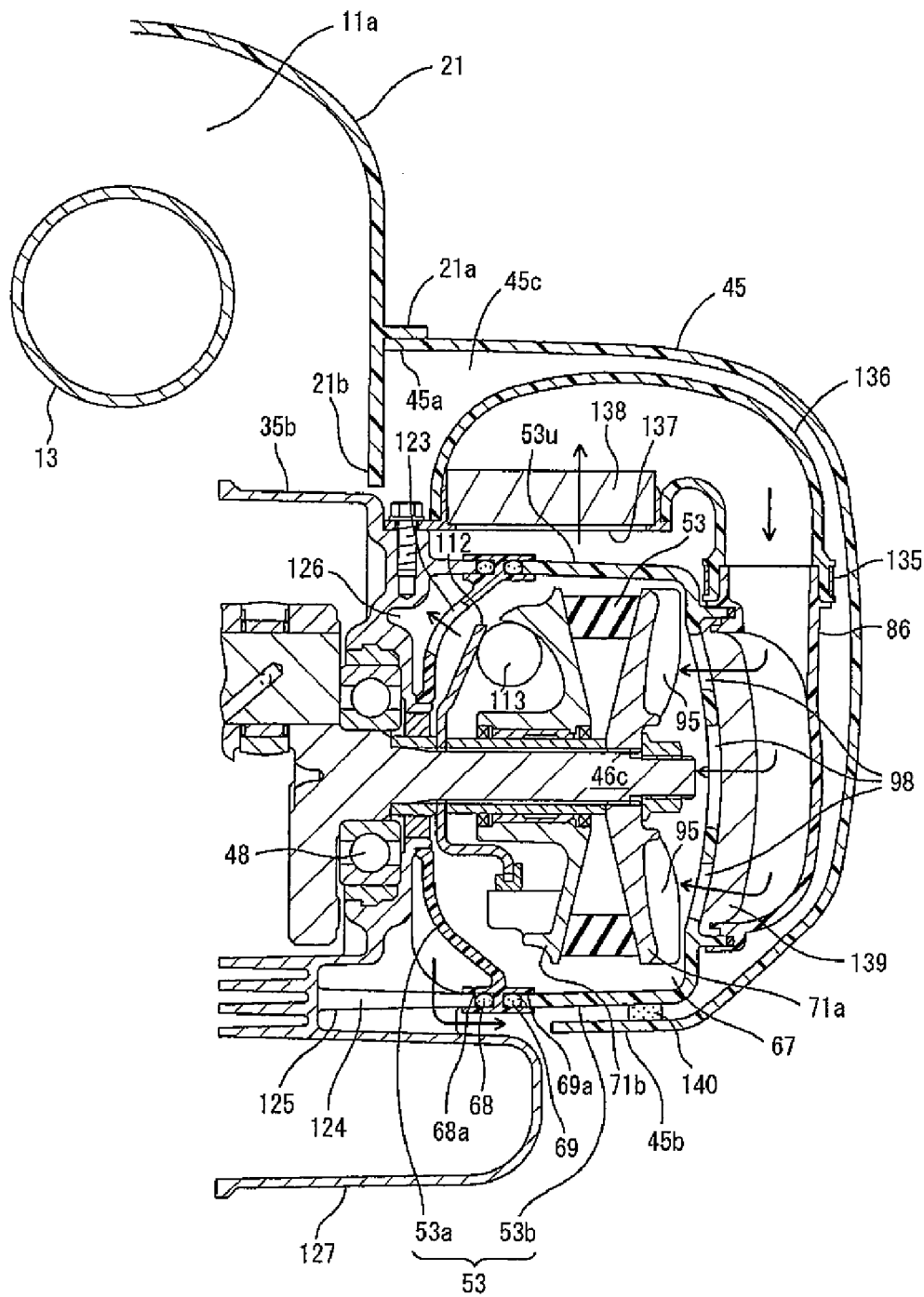
FIG. 10 is a sectional view inside of the transmission case and the intake duct according to a modified example.

The shape of overlapping the cover 45 and the body cover 21 is not limited. For example, as shown by FIG. 10, the body cover 21 may be provided with a projected piece 21a projected to an outer side, and the left end portion 45a of the cover 45 and the projected piece 21a may overlap in an up and down direction.

Further, according to the embodiment, the inner space 45c of the cover 45 and the center tunnel 11a communicate with each other. Therefore, air inside of the center tunnel 11a is mainly sucked from the intake duct 136. Therefore, in comparison with the case of directly sucking air outside of the center tunnel 11a (outer side of the vehicle body cover 21) to the intake duct 136, water, dust or the like is restrained from flowing into the belt chamber 67, and reliability of CVT 30 is improved.

As shown by FIG. 2, according to the embodiment, the leg shield 34R is arranged on the front side of the transmission case 53, and the leg shield 34R extends to an outer side in the vehicle width direction of the intake duct 136. Therefore, water, dust or the like splashed to the transmission case 53 from the front side is prevented by the leg shield 34R, and water, dust or the like is further restrained from flowing into belt chamber 67. Further, the intake duct 136 is not projected in the vehicle width direction in comparison with the leg shield 34R and therefore, slim formation of the vehicle is not deteriorated by intake duct 136.

Further, according to the embodiment, the length in the front and rear direction of the intake duct 136 becomes shorter than the length in the front and rear direction of the transmission case 53. Therefore, compact formation of the air path is achieved.

As described above, according to the embodiment, in the plane view, the outer side end (right side end) in the vehicle width direction of the intake duct 136 is disposed on the inner side (left side) of the outer side end (right side end) in the vehicle width direction of the transmission case 53 (refer to FIG. 2). Therefore, the intake duct 136 is not projected in the side direction from the transmission case 53 and slim formation of the motorcycle 10 is improved.

As shown by FIG. 1, according to the embodiment, the intake duct 136 is disposed on the upper side between the primary sheave shaft 46c and the secondary sheave shaft 62. Thereby, the space on the upper side between the two sheave shafts 46c, 62 of CVT 30 which is not utilized effectively in the background art is effectively utilized by the present invention.

As shown by FIG. 3, the transmission case 53 includes the upper face portion 53u, and the upper face portion 53u is inclined in the front lower direction in running. Therefore, water, dust or the like cannot be stored at the upper face portion 53u. Further, according to the embodiment, the intake port 137 of the intake duct 136 is opposed to the upper face portion 53u. Therefore, water, dust or the like is further restrained from being sucked from the intake port 137.

According to the embodiment, the intake duct 136 is arranged on a side opposed to a side of the chain 109 in the left and right direction of the motorcycle 10. That is, whereas the chain 109 is at a left half portion of the motorcycle 10, the intake duct 136 is at a right half portion of the motorcycle 10. Thus, interference of the intake duct 136 and the chain 109 is easily avoided. Therefore, a sufficiently large space is provided for installing the intake duct 136. Further, the position of the intake duct 136 in the left and right direction is not limited, for example, the intake duct 136 can be at the left half portion of the motorcycle 10 and the power transmission mechanism of the chain 109 or the like can be at the right half portion of the motorcycle 10.

Second Embodiment

According to the first embodiment, the intake duct 136 partitioning the intake path is arranged on the outer side in the vehicle width direction of the center tunnel 11a and above the transmission case 53. However, the air path arranged on the outer side of the center tunnel 11a and above the transmission case 53 is not limited to the intake path. According to a second embodiment shown in FIGS. 11-13, an exhaust path for exhausting air after having cooled CVT 30 is disposed on the outer side in the vehicle width direction of the center tunnel 11a and above the transmission case 53.

Figure 11:
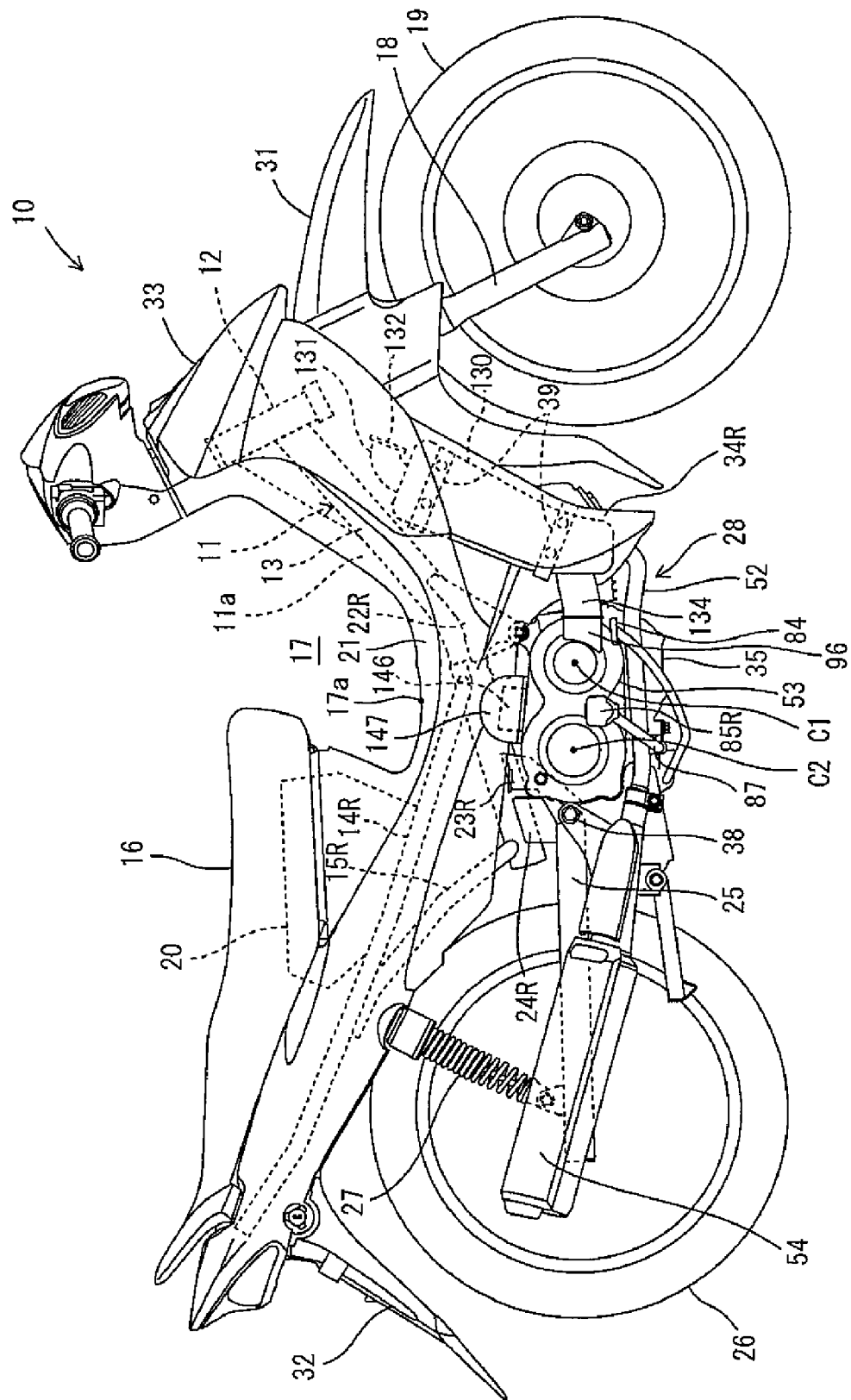
FIG. 11 is a side view of a motorcycle according to a second embodiment of the invention.
Figure 12:
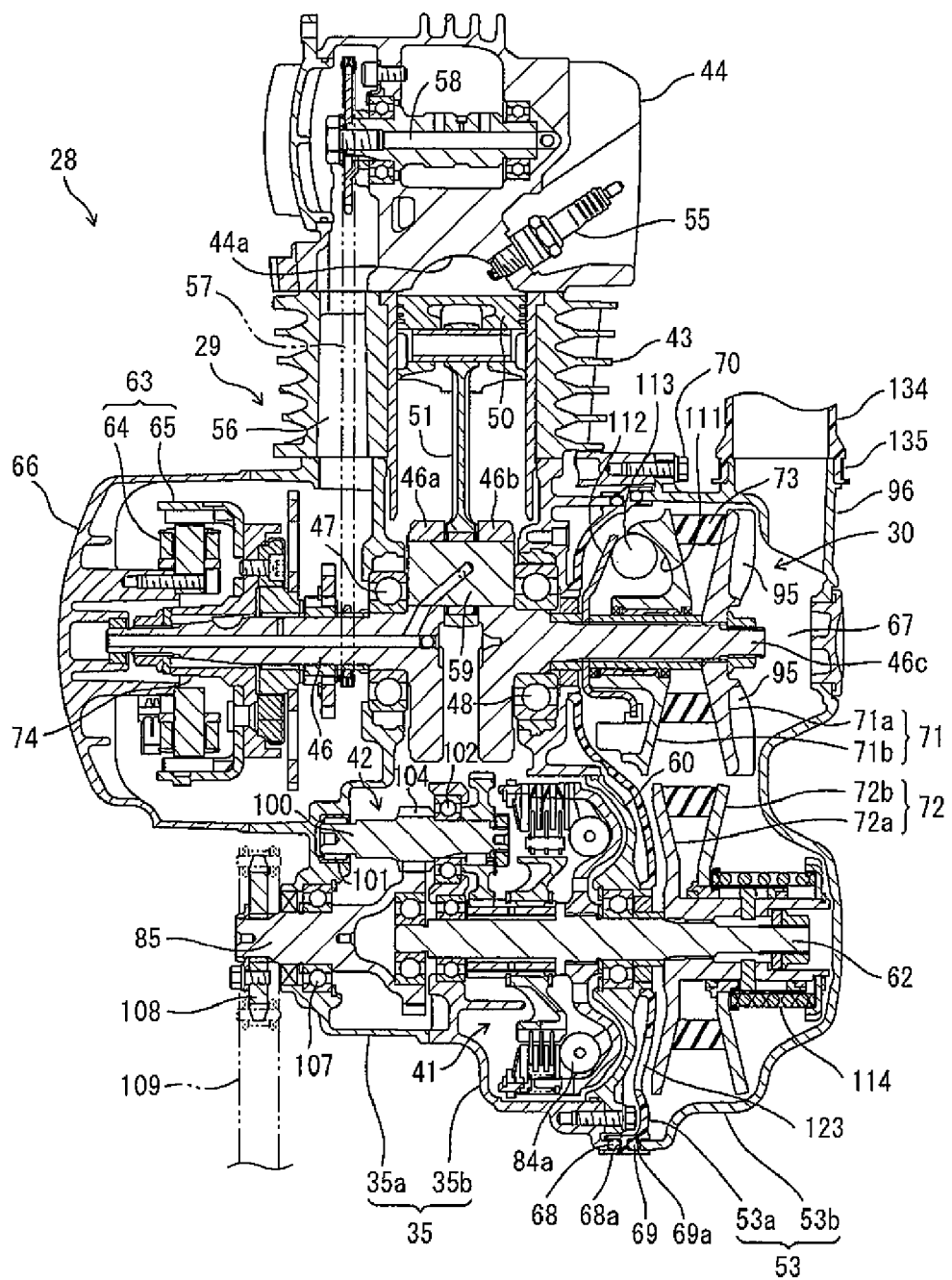
FIG. 12 is a sectional view showing an inner structure of an engine unit according to the second embodiment.

As shown by FIGS. 11 and 12, according to the embodiment, a connecting tube 96 is formed on a front side portion (portion on a side of the primary sheave 71) of the outer side case 53b of the transmission case 53, and is connected with an intake duct 134. An upstream side of the intake duct 134 is connected to an air chamber 130. The air chamber 130 is arranged on a rear side of the leg shield 34R on the right side. The air chamber 130 is formed in a shape of a box prolonged in one direction and is extended in a skewed up and down direction along a longitudinal direction of the leg shield 34R.

As shown by FIG. 11, an upper portion of the air chamber 130 is provided with an intake duct 131 for taking in air. The intake duct 131 is formed by a bent tube extended in a front skewed upper direction from an upper face of the air chamber 130. An intake port 132 of the intake duct 131 is opened in the front skewed downward direction and is opposed to a back face of the leg shield 34R. However, a direction of opening the intake port 132 is not limited. An inner portion of the air chamber 130 is contained with a filter, not illustrated.

The air chamber 130, the intake duct 131, and the intake duct 134 are formed by resin materials. However, the materials of the air chamber 130, the intake duct 131, and the intake duct 134 are not limited and may be formed by other materials.

Also, a method of attaching the air chamber 130 is not limited. For example, as shown by FIG. 11, a bracket 39 may be provided at the leg shield 34R, and the air chamber 130 may be fixed to the bracket 39 by a bolt or the like.

Figure 13:
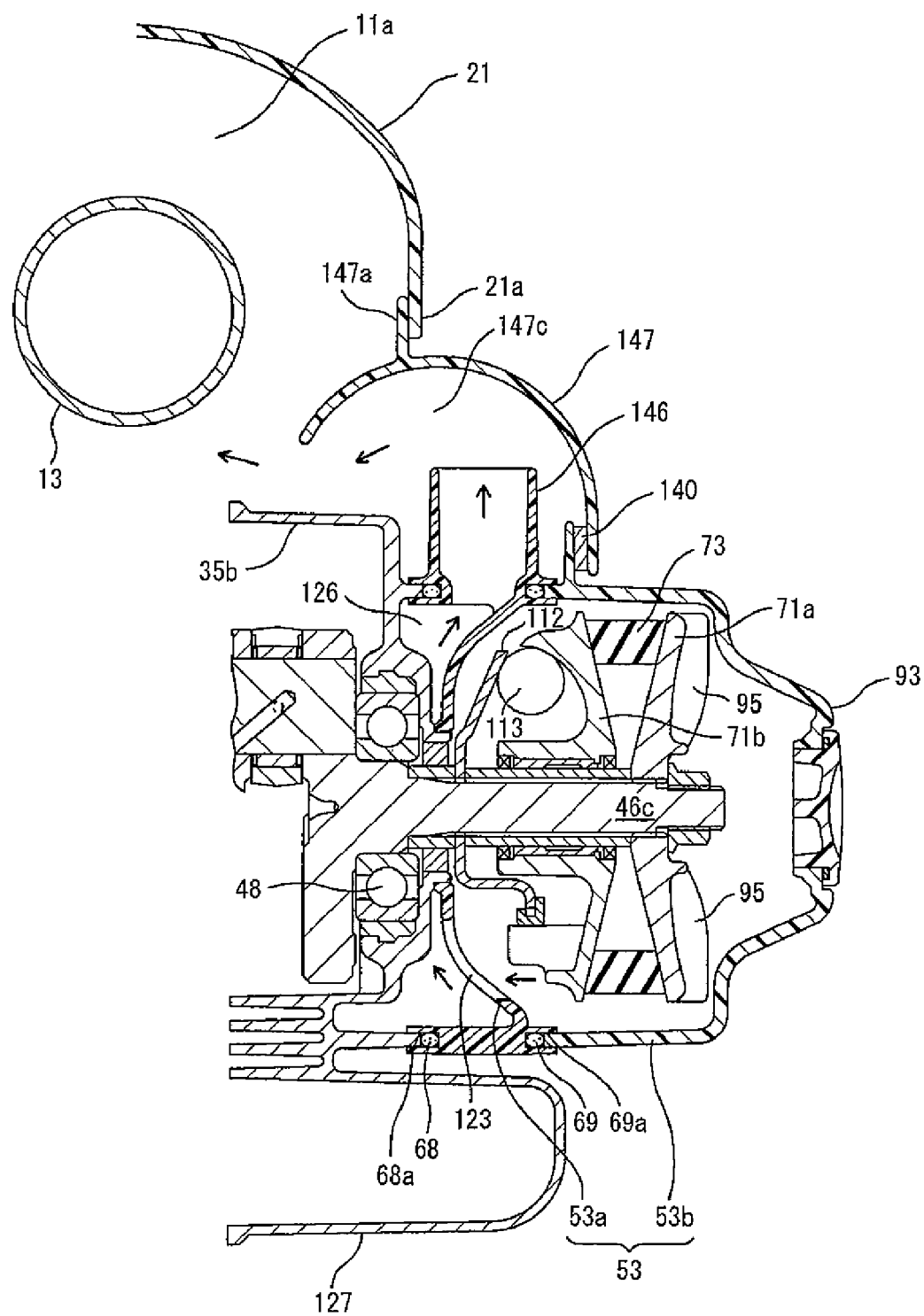
FIG. 13 is a sectional view inside of a transmission case and an exhaust duct according to the second embodiment.

As shown by FIG. 13, according to the embodiment, a duct 123 of the inner side case 53a is formed at a lower half portion of the inner side case 53a. Further, the second case block 35b is not formed with the duct 124 (refer to FIG. 8).

An upper side of the transmission case 53 (further in details, the inner side case 53a) is provided with an exhaust duct 146 partitioning the exhaust path. Although according to the embodiment, the exhaust duct 146 is integrally formed with the inner side case 53a, the exhaust duct 146 may be separate from the inner side case 53a. The exhaust duct 146 is formed by a straight tube extended in an upper direction. However, a specific shape of the exhaust duct 146 is not limited.

The exhaust duct 146 is covered by a cover 147. The cover 147 is provided with a ridge-like sectional shape projected to an upper side.

The exhaust duct 146 communicates with the space 126 formed between the inner side case 53a and the second case block 35b. Therefore, air in space 126 is guided to an inner space 147c of the cover 147 by passing the exhaust duct 146.

An upper portion of the cover 147 is formed with a projected piece 147a projected to the upper side, and the projected piece 147a overlaps the lower end portion 21a of the vehicle body cover 21 in the left and right direction. That is, the cover 147 partially overlaps the vehicle body cover 21. Further, the cover 147 and the vehicle body cover 21 may directly overlap, or may overlap by a seal member or the like. A lower end portion of the cover 147 overlaps the outer side case 53b by a seal member 140.

As shown by FIG. 1, the exhaust duct 146 is arranged on the upper side between the axis center C1 of the primary sheave shaft 46c and the axis center C2 of the secondary sheave shaft 62. An upper end of the exhaust duct 146 is arranged at a position lower than the lower end 17a of the recessed shape space 17 on the front side of the seat 16.

The remaining description is similar to that of the first embodiment and is therefore omitted.

According to the embodiment, air is sucked into the air chamber 130 through intake duct 131 (refer to FIG. 11) on the rear side of the leg shield 34R, the air is cleaned by passing a filter, not illustrated, and is then sucked into belt chamber 67 through intake duct 134 and the connecting tube 96. Air sucked into belt chamber 67 flows around and cools primary sheave 71, secondary sheave 72 and V belt 73.

As shown by FIG. 13, air which has cooled the primary sheave 71, the secondary sheave 72 and the V belt 73 is discharged from the belt chamber 67 through duct 123 of the inner side case 53a and flows to the space 126 between the inner side case 53a and the second case block 35b. Air in space 126 is guided to the inner space 147c of the cover 147 through exhaust duct 146 and is discharged to outside through center tunnel 11a. CVT 30 is cooled by this flow of air.

According to the embodiment, the space on the outer side in the vehicle width direction of the center tunnel 11a and on the upper side of the transmission case 53 is effectively utilized as a space of installing the exhaust path for exhausting air from the belt chamber 67. Therefore, the space of installing the exhaust path is ensured without upsizing body cover 21. As a result, an exhaust path having a sufficient flow path area is realized, and improved cooling of CVT 30 and downsizing of body cover 21 are made to be compatible with each other.

Third Embodiment

In the first embodiment (refer to FIG. 9), body cover 21 and the cover 45 are formed separately and overlapped partially. Further, the intake duct 136 is arranged outward in the vehicle width direction as compared with the body cover 21. Also in the second embodiment (refer to FIG. 13), the body cover 21 and the cover 147 are formed separately and overlapped partially. Further, the exhaust duct 146 is arranged outward in the vehicle width direction as compared with the vehicle body cover 21. However, the body cover covering the center tunnel and the cover covering the duct may be formed integrally.

Figure 14:
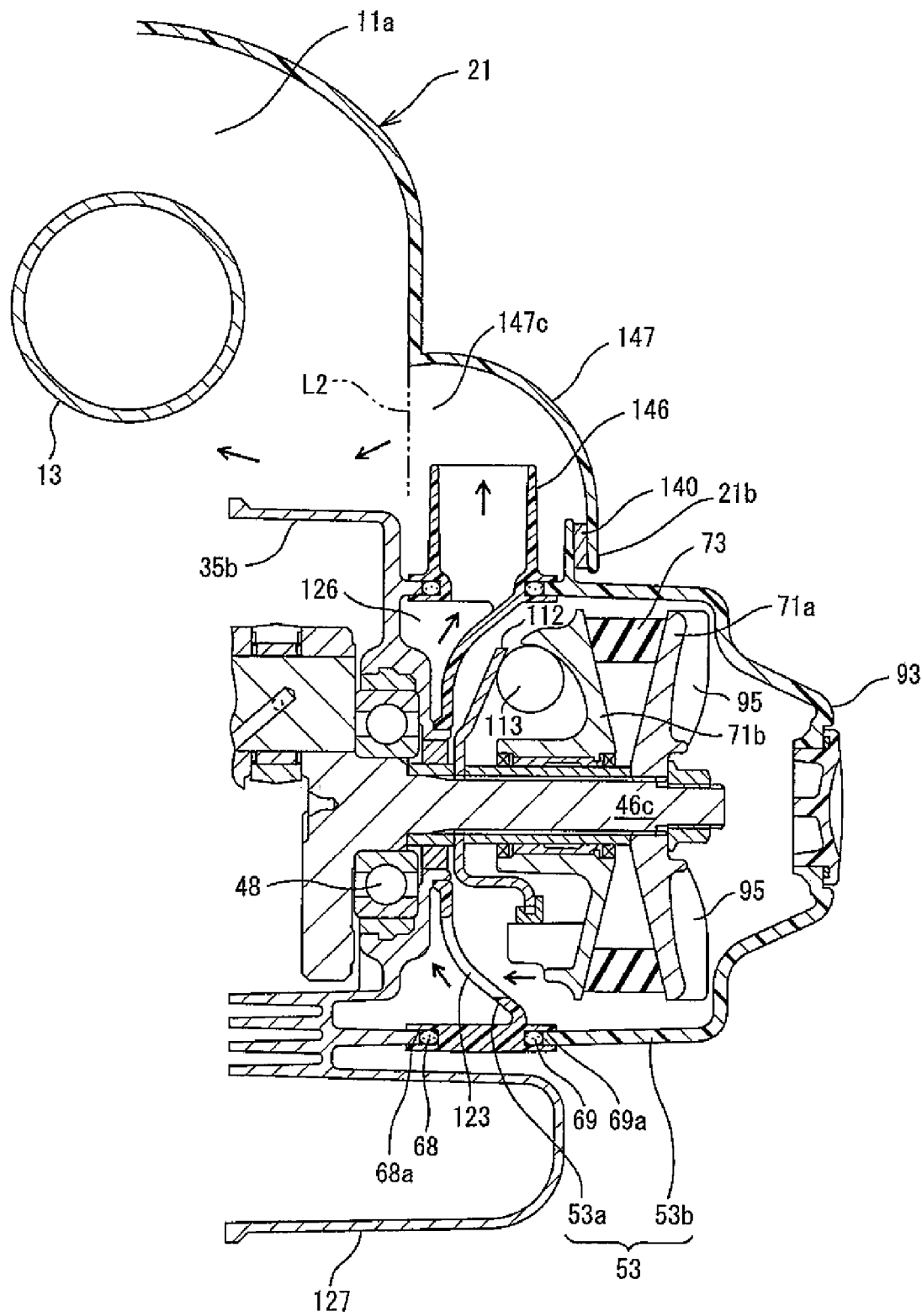
FIG. 14 is a sectional view inside of a transmission case and an exhaust duct according to the third embodiment of the invention.

According to the third embodiment shown in FIG. 14, the body cover 21 and the cover 147 are formed integrally. In other words, the cover 147 forms a part of the body cover 21. Therefore, exhaust duct 146 is arranged outward in the vehicle width direction (a left and right direction of FIG. 14) as compared with the center tunnel 11a and positioned inward in the vehicle width direction as compared with an outer end 21b of the vehicle body cover 21. An imaginary line L2 in FIG. 14 represents an outer boundary of the center tunnel 11a.

The remaining description is the same as that of the second embodiment and an effect similar to that of the second embodiment is obtained.

Although not shown in the figure, in the first embodiment (refer to FIG. 9), the body cover 21 participating the center tunnel 11a and the cover 45 covering the intake duct 136 may be formed integrally. In this case, the intake duct 136 is arranged outward in the vehicle width direction as compared with the center tunnel 11a and positioned inward in the vehicle width direction as compared with an outer end of the vehicle body cover 21.

As has been explained, the invention is useful for a riding type vehicle such as a motorcycle or the like.

The particular embodiments of the invention described in this document should be considered illustrative, rather than restrictive. Modification to the described embodiments may be made without departing from the spirit of the invention as defined by the following claims.

The invention claimed is:

1. A riding type vehicle having a frame, a seat and a recessed space on a front side of the seat comprising:
   a vehicle body cover covering the frame, defining the recessed space outside of the vehicle body cover and a center tunnel inside of the vehicle body cover;
   an engine unit supported by the frame below the recessed space and including an engine, a transmission case formed with a belt chamber and a V-belt continuously variable transmission contained in the belt chamber; and
   an air path disposed outward in a vehicle width direction of the center tunnel and above the transmission case for communicating with the belt chamber;
   wherein an upper end of the air path is lower than a lower end of the recessed space.

2. The riding type vehicle according to claim 1, further comprising a duct partitioning the air path, and a cover opened inward in the vehicle width direction for covering an outer side of the duct.

3. The riding type vehicle according to claim 1, further comprising:
   a duct partitioning the air path; and
   a cover opened inward in the vehicle width direction for covering an outer side of the duct;
   wherein the vehicle body cover and the cover partially overlap each other.

4. The riding type vehicle according to claim 3, wherein an inner space of the cover and the center tunnel communicate with each other.

5. The riding type vehicle according to claim 1, further comprising a leg shield extended in an up and down direction on a front side of the transmission case and extended outward in the vehicle width direction of the air path.

6. The riding type vehicle according to claim 1, wherein a length of the air path is shorter than a length of the transmission case in a front-to-rear direction.

7. The riding type vehicle according to claim 1, further comprising:
   a foot mounting member arranged outward in the vehicle width direction of the transmission case for supporting a foot of a passenger;
   wherein an outer end of the air path is disposed inward of an inner end of the foot mounting member in the vehicle width direction.

8. The riding type vehicle according to claim 1, wherein the V-belt continuously variable transmission includes a first sheave shaft, and a second sheave shaft disposed on a rear side of the first sheave shaft;
   wherein at least a portion of the air path is disposed on an upper side between the first sheave shaft and the second sheave shaft.

9. The riding type vehicle according to claim 1, wherein the transmission case includes an upper face portion inclined in a front upper direction or a front lower direction in running the vehicle; and wherein the air path is formed with an intake port opposed to the upper face portion of the transmission case.

10. The riding type vehicle according to claim 1, wherein the V-belt continuously variable transmission includes a primary sheave, and a secondary sheave disposed on a rear side of the primary sheave and having a diameter larger than a diameter of the primary sheave;

wherein the transmission case includes an upper face portion inclined in a front lower direction in running the vehicle; and wherein the air path is formed with an intake port opposed to the upper face portion of the transmission case.

11. The riding type vehicle according to claim 1, further comprising an intake duct partitioning the air path.

12. The riding type vehicle according to claim 1, further comprising a rear wheel and a power transmission mechanism for transmitting a driving force of the engine to the rear wheel.

13. The riding type vehicle according to claim 12, wherein either one of the air path and the power transmission mechanism is arranged on a right half portion of the vehicle, and the other is arranged on a left half portion of the vehicle.

14. The riding type vehicle according to claim 1, wherein the air path is arranged outward in the vehicle width direction as compared with the vehicle body cover.

15. The riding type vehicle according to claim 1, wherein the recessed space is positioned above a portion of the vehicle body cover disposed in front of the seat.

16. A riding type vehicle comprising:

a frame;

an engine unit supported by the frame and including an engine, a transmission case formed with a belt chamber, and a V-belt continuously variable transmission contained in the belt chamber;

a foot mounting member disposed outward in a vehicle width direction of the transmission case for supporting a foot of a passenger; and an air path disposed above the transmission case for communicating with the belt chamber; wherein an outer end of the air path is disposed inward of an inner end of the foot mounting member in the vehicle width direction, and the air path is positioned between the frame and the foot mounting member in a plan view of the vehicle.

* * * * *

UNITED STATES PATENT AND TRADEMARK OFFICE
CERTIFICATE OF CORRECTION

PATENT NO.       : 7,647,995 B2                                    Page 1 of 1
APPLICATION NO.  : 11/461331
DATED            : January 19, 2010
INVENTOR(S)      : Ishida et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 656 days.

Signed and Sealed this

Sixteenth Day of November, 2010

David J. Kappos
*Director of the United States Patent and Trademark Office*